United States Patent
Kim et al.

(10) Patent No.: US 11,265,123 B2
(45) Date of Patent: Mar. 1, 2022

(54) METHOD FOR TRANSMITTING AND RECEIVING REFERENCE SIGNAL IN WIRELESS COMMUNICATION SYSTEM AND APPARATUS THEREFOR

(71) Applicant: LG Electronics Inc., Seoul (KR)

(72) Inventors: Myeongjin Kim, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/640,980

(22) PCT Filed: Aug. 20, 2018

(86) PCT No.: PCT/KR2018/009522
§ 371 (c)(1),
(2) Date: Feb. 21, 2020

(87) PCT Pub. No.: WO2019/039812
PCT Pub. Date: Feb. 28, 2019

(65) Prior Publication Data
US 2020/0204317 A1    Jun. 25, 2020

Related U.S. Application Data

(60) Provisional application No. 62/548,391, filed on Aug. 21, 2017.

(51) Int. Cl.
*H04L 5/00* (2006.01)
*H04W 4/029* (2018.01)

(52) U.S. Cl.
CPC .......... *H04L 5/0048* (2013.01); *H04W 4/029* (2018.02)

(58) Field of Classification Search
CPC ............ H04L 5/0048; H04L 27/2613; H04L 27/26136; H04W 4/029; H04W 56/00; H04W 64/00

(Continued)

(56) References Cited

U.S. PATENT DOCUMENTS 10,834,534 B2 * 11/2020 Kim .................. H04W 4/025
2008/0007453 A1 * 1/2008 Vassilakis ........ H01Q 21/0025
342/368

(Continued)

FOREIGN PATENT DOCUMENTS

JP      2003207557       7/2003
WO   WO-2020204600 A2 * 10/2020 ........... H04B 7/0408

OTHER PUBLICATIONS

K. Radnosrati, C. Fritsche, F. Gunnarsson, F. Gustafsson and G. Hendeby, "Localization in 3GPP LTE Based on One RTT and One TDOA Observation," in IEEE Transactions on Vehicular Technology, vol. 69, No. 3, pp. 3399-3411, Mar. 2020, doi: 10.1109/TVT. 2020.2968118. (Year: 2020).*

(Continued)

*Primary Examiner* — William D Cumming
(74) *Attorney, Agent, or Firm* — Fish & Richardson P.C.

(57) ABSTRACT

A method for a terminal to transmit and receive signals for position estimation in a wireless communication system includes: receiving a downlink (DL) positioning reference signal (PRS) from each of a serving base station and reference base stations; measuring phase differences between sinusoidal components included in the DL PRSs for each of the serving base station and the reference base stations; generating an uplink (UL) PRS on the basis of the measured phase differences; and transmitting the UL PRS to the serving base station, wherein the terminal may report the phase difference measured for the serving base station and the phase differences measured for the reference base stations through the transmission of the UL PRS to the serving base station. The terminal is capable of communicating with at least one of another terminal, a terminal related to an autonomous driving vehicle, a base station or a network.

8 Claims, 13 Drawing Sheets

(58) Field of Classification Search
USPC ......................................................... 370/328
See application file for complete search history.

(56) References Cited

U.S. PATENT DOCUMENTS

| | | | |
|---|---|---|---|
| 2010/0260154 A1 | 10/2010 | Frank et al. | |
| 2012/0201195 A1* | 8/2012 | Rausch | G01S 5/021 |
| | | | 370/328 |
| 2016/0212738 A1 | 7/2016 | Thurfjell et al. | |
| 2017/0059689 A1 | 3/2017 | Edge et al. | |
| 2019/0200320 A1* | 6/2019 | Selvaganapathy | H04W 64/00 |
| 2020/0128357 A1* | 4/2020 | Kim | H04W 64/00 |
| 2020/0204317 A1* | 6/2020 | Kim | H04L 27/2613 |
| 2020/0351815 A1* | 11/2020 | Kim | H04L 5/0048 |
| 2021/0067382 A1* | 3/2021 | Manolakos | H04L 25/0226 |
| 2021/0109188 A1* | 4/2021 | Kumar | G01S 5/021 |

OTHER PUBLICATIONS

PCT International Search Report and Written Opinion in International Application No. PCT/KR2018/009522, dated Dec. 14, 2018, 25 pages (with English translation).

Qualcomm Incorporated, "Introduction of PRS based Terrestrial Beacon System," R1-164450, 3GPP TSG-RAN WG1 Meeting #85, Nanjing, China, dated May 23-27, 2016, 9 pages.

Sackenreuter et al., "Low-Complexity PDoA-based Localization," 2016 International Conference on Indoor Positioning and Indoor Navigation (IPIN), dated Oct. 4, 2016, 6 pages.

EP Extended European Search Report in European Appln. No. 18847987.7, dated Mar. 24, 2021, 6 pages.

* cited by examiner (a)  (b)

METHOD FOR TRANSMITTING AND RECEIVING REFERENCE SIGNAL IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/009522, filed on Aug. 20, 2018, which claims the benefit of U.S. Provisional Application No. 62/548,391, filed on Aug. 21, 2017. The disclosures of the prior applications are incorporated by reference in their entirety.

TECHNICAL FIELD

The present disclosure relates to transmitting and receiving reference signals in a wireless communication system, and more particularly, to a method for transmitting or receiving a positioning reference signal (PRS) for estimation of a location, and an apparatus therefor.

BACKGROUND ART

First, the existing 3rd generation partnership project long term evolution (3GPP LTE)/long term evolution-advanced (LTE-A) system will be briefly described. Referring to FIG. 1, a user equipment (UE) performs an initial cell search (S101). In the initial cell search process, the UE receives a primary synchronization channel (P-SCH) and a secondary synchronization channel (S-SCH) from a base station (BS), performs downlink synchronization with the BS, and acquires information such as a cell identifier (ID). Thereafter, the UE acquires system information (e.g., master information block (MIB)) through a physical broadcast channel (PBCH). The UE can receive the downlink (DL) reference signal (RS) and check the downlink channel status.

After the initial cell search, the UE can acquire more detailed system information (e.g., system information blocks (SIBs)) by receiving a Physical Downlink Control Channel (PDCCH) and a physical downlink control channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCC/PDSCH reception (S107) and physical uplink shared channel (PUSCH)/physical uplink control channel (PUCCH) transmission (S108) as a general uplink/downlink signal transmission procedure. The UE can transmit uplink control information (UCI) to the BS. The UCI may include hybrid automatic repeat request acknowledgment/negative acknowledgment (HARQ ACK/NACK), scheduling request (SR), channel quality indicator (CQI), precoding matrix indicator (PMI) and/or rank indicator (RI), etc.

DISCLOSURE

Technical Problem

An object of the present disclosure is to provide a method and apparatus for accurately and efficiently measuring the distance and positions between a plurality of wireless devices through a phase difference of a reference signal transmitted and received by the wireless devices.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for transmitting and receiving, by a terminal, a signal for location estimation in a wireless communication system may include receiving a downlink (DL) positioning reference signal (PRS) from each of a serving base station and reference base stations, measuring a phase difference between sinusoidal components included in the DL PRS for each of the serving base station and the reference base stations, generating an uplink (UL) PRS based on the measured phase differences, and transmitting the UL PRS to the serving base station, wherein the terminal may report the phase difference measured for the serving base station and the phase differences measured for the reference base stations to the serving base station through the transmitting of the UL PRS.

In another aspect of the present disclosure, a terminal for transmitting and receiving a signal for location estimation may include a transceiver, and a processor configure to control the transceiver to receive a downlink (DL) positioning reference signal (PRS) from each of a serving base station and reference base stations, measure a phase difference between sinusoidal components included in the DL PRS for each of the serving base station and the reference base stations, generate an uplink (UL) PRS based on the measured phase differences, and transmit the UL PRS to the serving base station, wherein the processor may report the phase difference measured for the serving base station and the phase differences measured for the reference base stations to the serving base station through transmission of the UL PRS.

The UL PRS generated by the terminal may include a first sinusoidal component representing the phase difference measured for the serving base station, a second sinusoidal component representing the phase difference measured for a first reference base station among the reference base stations, a third sinusoidal component representing the phase difference measured for a second reference base station.

The first sinusoidal component may be related to $A*\exp(j*(w*(t-t_{UE,s,Rx}-n*t_{symbol})+arg1)))$, the second sinusoidal component may be related to $A*\exp(j*(w*(t-t_{UE,s,Rx}-n*t_{symbol})+arg2)))$, and the third sinusoidal component may be related to $A*\exp(j*(w*(t-t_{UE,s,Rx}-n*t_{symbol})+arg3)))$, wherein 'A' may denote an amplitude of the UL PRS, 'w' may denote an angular frequency, 't' may denote a transmission time of the UL PRS, and '$t_{UE,s,Rx}$' may denote a time for starting signal processing of the DL PRS, 'n' may denote the number of symbols between a symbol for reception of the DL PRS and a symbol for transmission of the UL PRS, '$t_{symbol}$' may denote a duration of one symbol, 'arg1' may denote the phase difference measured for the serving base station, 'arg2' may denote the phase difference measured for the first reference base station, and 'arg3' may denote the phase difference measured for the second reference base station.

The phase difference measured for the serving base station may be related to $(w_2-w_1)(t_{UE,s,RX}-t_{ServingBs,s,Tx})-(w_2/c-w_1/c)*x$, wherein 'w1' and 'w2' may denote angular frequencies of the sinusoidal components included in the DL PRS of the serving base station, '$t_{UE,s,Rx}$' may denote a time for starting signal processing of the DL PRS, '$t_{ServingBs,s,Tx}$' may denote a time for transmission of the DL PRS by the serving base station, 'c' may denote a speed of light, and 'x' may denote a distance between the serving base station and the terminal.

The terminal may select reference base stations having transmitted the DL PRSs of a signal strength exceeding a threshold among the reference base stations, and report the phase differences for the selected reference base stations through the UL PRS.

In another aspect of the present disclosure, a method for transmitting and receiving, by a serving base station, a signal for estimation of a location of a terminal in a wireless communication system may include transmitting a downlink (DL) positioning reference signal (PRS) including sinusoidal components to the terminal, receiving an uplink (UL) PRS from the terminal, a first PRS from a first reference base station, and a second PRS from a second reference base station, respectively, and estimating a distance between the terminal and the serving base station, a distance between the terminal and the first reference base station, and a distance between the terminal and the second reference base station based on the UL PRS, the first PRS, and the second PRS.

In another aspect of the present disclosure, a base station for transmitting and receiving a signal for estimation of a location of a terminal may include a transceiver and a processor configure to control the transceiver to transmit a downlink (DL) positioning reference signal (PRS) including sinusoidal components to the terminal, receive an uplink (UL) PRS from the terminal, a first PRS from a first reference base station, and a second PRS from a second reference base station, respectively, and estimate a distance between the terminal and the serving base station, a distance between the terminal and the first reference base station, and a distance between the terminal and the second reference base station based on the UL PRS, the first PRS, and the second PRS.

The serving base station may acquire, through the UL PRS, a first phase difference measured by the terminal for the sinusoidal components of the DL PRS of the serving base station, and a second phase difference measured by the terminal for sinusoidal components of a DL PRS of the first reference base station, and a third phase difference measured by the terminal for sinusoidal components of a DL PRS of the second reference base station.

The serving base station may estimate the distance between the terminal and the serving base station based on the first phase difference, estimate the distance between the terminal and the first reference base station based on the second phase difference and the first PRS, and estimate the distance between the terminal and the second reference base station based on the third phase difference and the second PRS.

The UL PRS may contain a first sinusoidal component related to $A*\exp(j*(w*(t-t_{UE,s,Rx}-n*t_{symbol})+arg1)))$, a second sinusoidal component related to $A*\exp(j*(w*(t-t_{UE,s,Rx}-n*t_{symbol})+arg2)))$, and a third sinusoidal component related to $A*\exp(j*(w*(t-t_{UE,s,Rx}-n*t_{symbol})+arg3)))$, wherein 'A' may denote an amplitude of the UL PRS, 'w' may denote an angular frequency, 't' may denote a transmission time of the UL PRS, and '$t_{UE,s,Rx}$' may denote a time for starting signal processing of the DL PRS, 'n' may denote the number of symbols between a symbol for reception of the DL PRS by the terminal and a symbol for transmission of the UL PRS, '$t_{symbol}$' may denote a duration of one symbol, 'arg1' may denote the first phase difference, 'arg2' may denote the second phase difference, and 'arg3' may denote the third phase difference.

The distance between the terminal and the first reference base station may be related to $\{arg2-arg4-(w_4-w_3)*(t_{UE,s,Rx}-t_{ServingBS,s,Rx})\}/(w_4/c-w_3/c)$, wherein 'arg2' may denote the second phase difference, 'arg4' may denote a phase difference measured by the serving base station through the first PRS, 'w3' and 'w4' are angular frequencies of the sinusoidal components of the DL PRS of the first reference base station, respectively, '$t_{UE,s,Rx}$' may denote a time for starting signal processing of the DL PRS of the first reference base station by the terminal, '$t_{ServingBS,s,Rx}$' is time for starting signal processing of the first PRS by the serving base station, and 'c' may denote a speed of light.

The serving base station may estimate the location of the terminal based on the distance between the terminal and the serving base station, the distance between the terminal and the first reference base station, and the distance between the terminal and the second reference base station.

Advantageous Effects

According to an embodiment of the present disclosure, information on phase differences measured by a terminal through DL PRSs of a plurality of base stations only needs to be reported to a serving base station through one UL PRS transmission. Therefore, overhead of the terminal according to UL PRS transmission and scheduling complexity of the network may be minimized, and an issue of inaccurate distance/location measurement may be addressed when the terminal transmits a UL PRS to another neighboring base station.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
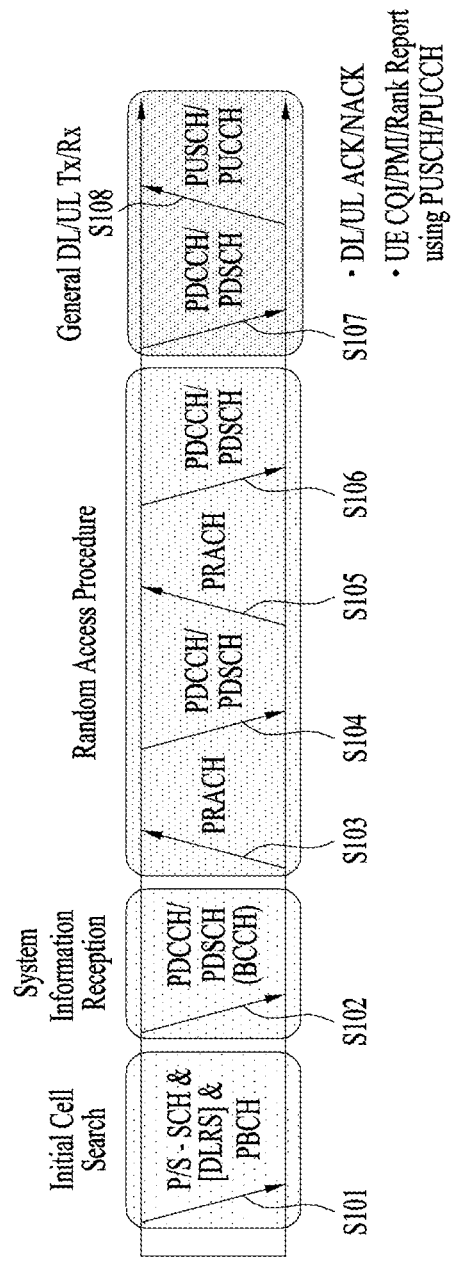
FIG. 1 illustrates physical channels used in a 3rd generation partnership project (3GPP LTE)/long term evolution-advanced (LTE-A) system and a general signal transmission method using the physical channels.

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as global system for mobile communications/general packet radio service/enhanced data rates for GSM evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of universal mobile telecommunications system (UMTS). 3rd generation partnership project long term evolution (3GPP LTE) is a part of evolved UMTS (E-UMTS) that uses E-UTRA. 3GPP LTE adopts OFDMA in downlink and adopts SC-FDMA in uplink. LTE-advanced (LTE-A) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies can be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Position measurement in a legacy LTE system will first be described briefly.

Position Measurement in LTE Systems

In the LTE system, a location position protocol (LPP) has been introduced. In an LPP model, a location server may transmit assistance data for positioning to a UE. That is, the location server may transmit the assistance data to the UE to enable the UE to use observed time difference of arrival (OTDOA)/assisted global navigation satellite system (A-GNSS). In the LPP model, the UE uses a reference signal (RS) (e.g., positioning RS) for positioning and transmits measurement information or location information from the RS to the location server (e.g., Evolved Serving Mobile Location Center (E-SMLC)/UPL location platform (SLP)), and the location server is responsible for making a final decision on a location. Location information and a method of transmitting and receiving the location information are standardized into the LPP standard, and the LPP standard may include an information element (IE) and a signaling procedure for location information.

The LPP technology largely includes three functions: one of them is A-GNSS, another function is OTDOA, and the other is enhanced cell ID (E-CID).

A-GNSS is a satellite-based positioning scheme, which offers the benefit of shortening an initial positioning time because basic satellite information for positioning is received through a wireless network (e.g., LTE). In the A-GNSS scheme, accurate location information is obtained through communication between a global positioning system (GPS) and a location server of the network.

In OTDOA, a measurement value called a reference signal time difference (RSTD) is used to calculate a propagation time difference between a reference evolved Node B (eNB) and a neighboring eNB. That is, a signal in a specific frame is received from the neighboring eNB, a tap closest in time to a tap received from the neighboring eNB is selected from among delay taps received in the frame from the reference eNB, and the time difference between the taps is calculated as an RSTD value. Therefore, performance may depend on how effective taps are estimated. As such, OTDOA is a scheme in which a UE obtains a distance and a location based on the difference between arrival times of multiple eNB (or cell) signals.

E-CID is a scheme of narrowing the location of a UE by combining a legacy CID scheme and a received signal strength indication (RSSI) scheme into a hybrid scheme. A received signal received power (RSRP) and a received signal received quality (RSRQ) are provided as related measurement values. In the E-CID scheme, the UE estimates a location through round trip measurement, pathloss related measurement, and angle of arrival measurement based on analysis of the RSRP of an LTE OFDMA signal.

PDOA (Phase Difference of Arrival) Based Positioning

In the present disclosure, a method for measuring a distance between multiple wireless communication devices and estimating a location of a specific device based on the measured distance is proposed.

[Distance Measurement]

First, a method of measuring, by a device which is a target of location measurement, a distance based on phase information about RSs received from multiple transmitters will be described. In the following description, a wireless device that transmits a signal first is referred to as a transmission device, and a device that receives a signal first is referred to as a reception device. It should be noted, however, that the transmission device may also receive a signal later, and the reception device may also transmit a signal. That is, the transmission device may include a transmitter and a receiver, and the reception device may include a transmitter and a receiver. As an example, the transmission device and the reception device may be a BS and a UE. As another example, the transmission device and the reception device may be a plurality of BSs or a plurality of UEs.

While the following examples are based on the assumption of transmission and reception of signals in two angular frequencies, which should not be construed as limiting the present disclosure, the present disclosure may be applied to more angular frequencies. It is also assumed in the examples that a plurality of angular frequency components are transmitted simultaneously, for the convenience of description. However, it is also possible to implement the present disclosure by transmitting the frequencies at predetermined different time points and considering the transmission time difference.

Further, it is assumed that a time point at which the transmission device/the reception device performs a signal transmission/reception operation is quantized. For example, when the transmission device/the reception device transmits/receives an OFDM signal, a boundary point of each OFDM symbol is a quantized time point for performing a transmission/reception operation. It is assumed that the starting time points of the transmission and reception operations of the transmission device and the reception device are $t_{s,TX}$ and $t_{s,RX}$, respectively, and are repeated every $t_{symb}$. $t_{symb}$ may be the length of an OFDM symbol.

Figure 2:
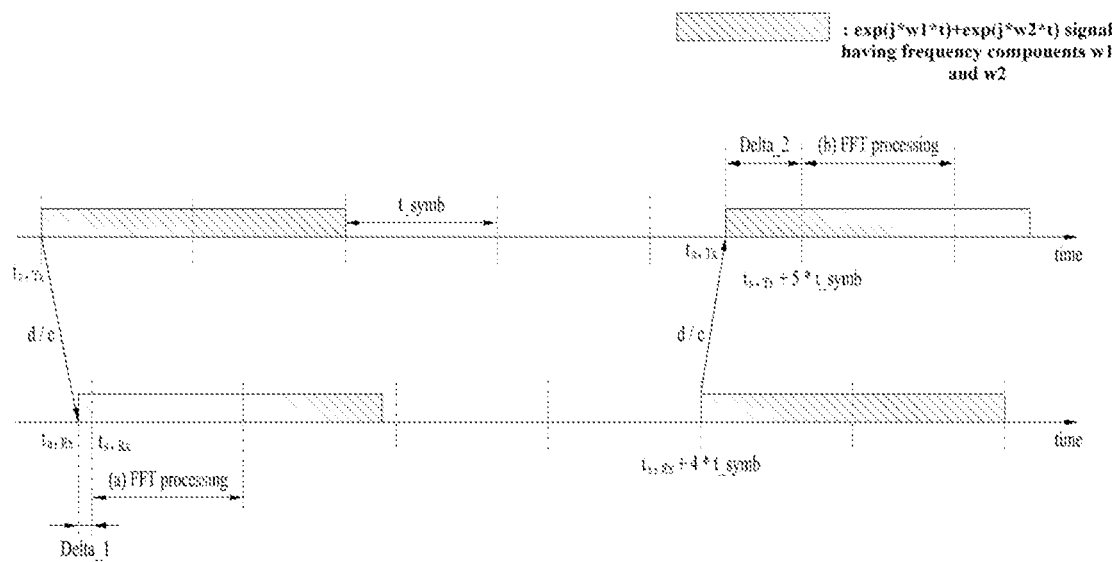
FIG. 2 illustrates a series of processes for measuring the distance between a transmission device and a reception device according to an embodiment of the present disclosure.

FIG. 2 is a flowchart illustrating a series of processes for measuring the distance between a transmission device and a reception device according to an embodiment of the present disclosure. While it is assumed that the reception device has been synchronized with a synchronization signal transmitted by the transmission device, for the convenience of description, distance measurement based on a phase difference may also be applied even when the transmission device and the reception device are asynchronous with each other.

Although for the convenience of description, a signal repeatedly transmitted during two symbols is considered, a signal transmission having a cyclic prefix (CP) and data for one symbol length may also be considered.

First, the transmission device transmits a sinusoidal signal having angular frequencies $w_1$ and $w_2$ as an RS (e.g., ranging RS) for distance measurement at a time $t_{s,Tx}$. For example, an RS for distance measurement at a specific time t may be defined by $RS(t)=e^{j*w1*t}+e^{j*w2*t}$. For convenience, a signal transmitted by the transmission device is referred to as a first signal.

The transmitted first signal is delayed by d/c based on the distance d between the transmission device and the reception device and the speed c of light and arrives at the reception device at a time $t_{a,Rx}$.

Due to sampling (or quantization), the reception device actually starts to acquire a baseband signal (e.g., sampled values) at the time $t_{a,Rx}$. If the size of fast Fourier transform (FFT) performed by the reception device is N, the reception device may obtain values corresponding to $w_1$ and $w_2$ by subjecting a total of N sampled values to FFT.

The phase difference between a $w_1$ component, $X_{RX}(w_1)$ and a $w_2$ component, $X_{RX}(w_2)$ of the FFT sampled values may be obtained by Equation 1.

$$\frac{X_{RX}(w_2)}{X_{RX}(w_1)} = \exp(j*(w_2 - w_1)(t_{s,RX} - t_{a,RX})) \qquad \text{[Equation 1]}$$

In Equation 1, the phase difference is $(w_2-w_1)$ $(t_{s,RX}-t_{a,RX})$. $X_{RX}(w_1)/X_{RX}(w_2)$ is a value that may be calculated from the first signal received by the reception device, and $(w_2-w_1)$ is a predefined value already known to the reception device. Therefore, the reception device may obtain Delta_1=$t_{s,RX}-t_{a,RX}$ by Equation 1. Delta_1 represents the difference between the starting time of OFM processing at the reception device and an actual arrival time of the first signal at the reception device.

Like the transmission device, the reception device transmits a sinusoidal signal (referred to as a second signal) having the angular frequencies w1 and w2 after n symbols. In FIG. 2, it is assumed that n=4.

Upon receipt of the second signal, the transmission device may acquire Delta_2=$t_{s,Tx}+(n+1)*t\_symb-t_{a,Tx}$ by FFT-processing N sampled values acquired starting from a time '$t_{s,Tx}+(n+1)*t\_symb$'.

Therefore, the round trip time (RTT) of a signal is defined by Equation 2.

$$2*d/c = t\_symb - \text{Delta}\_2 - \text{Delta}\_1 \qquad \text{[Equation 2]}$$

As described, c is a fixed constant (i.e., the speed of light). Although the transmission device knows the values of Delta_2 and t_symb, the transmission device does not know the value of Delta_1. Therefore, to measure the distance d between the transmission device and the reception device, the transmission device should acquire information about Delta_1 measured by the reception device. To this end, the reception device may provide a value of Delta_1 to the transmission device through the second signal. For example, when it is assumed that the value of Delta_1 corresponds to phase difference B, the reception device may set the phase difference between the w1 sinusoidal component and the w2 sinusoidal component in the second signal transmitted after n symbols (e.g., a positioning reference signal) to B. The transmission device may measure the distance between the transmission device and the reception device based on the received second signal.

When the reference signal RS(t) for distance measurement at a specific time t may be more generally defined as $RS(t)=\alpha_1*e^{j*(w1*t+\beta1)}+\alpha_2*e^{j*(w2*t+\beta2)}$. In this case, the first signal may be understood as the sum of a first sinusoidal component, $x_1(t)=\alpha_1*e^{j*(w1*t+\beta1)}$, and a second sinusoidal component, $x_2(t)=\alpha_2*e^{j*(w2*t+\beta2)}$. Here, $\alpha_1$ denotes the amplitude of the first sinusoidal component, and $\alpha_2$ denotes the amplitude of the second sinusoidal component. $\beta_1$ denotes the phase of the first sinusoidal component at t=0 (e.g., initial phase value or initial phase offset), and $\beta_2$ denotes the phase of the second sinusoidal component at t=0. The values of $\beta_1$ and $\beta_2$ may be pre-agreed between the transmission device and the reception device. In this case, Equation 1 may be modified as Equation 3 below.

$$\frac{X_{RX}(w_2)}{X_{RX}(w_1)} = \frac{\alpha_2}{\alpha_1} * e^{j\{(w_2-w_1)(t_{s,RX}-t_{a,RX})+(\beta_2-\beta_1)\}} \qquad \text{[Equation 3]}$$

In Equation 3, the phase difference $\Psi$ is $(w_2-w_1)(t_{s,RX}-t_{a,RX})+(\beta_2-\beta_1)$, and the difference between the initial phase values $(\beta_2-\beta_1)$ present since the time of transmission of the first signal should be removed from the phase difference $\Psi$. For example, the reception device may correct the phase difference $\Psi$ to $\theta$ using the initial phase values.

Since the values of $\beta_1$ and $\beta_2$ may be pre-agreed between the transmission device and the reception device, the phase difference $\theta$ according to the difference between the arrival time and the FFT start time as obtained by removing $(\beta_2-\beta_1)$ is $(w_2-w_1)(t_{s,RX}-t_{a,RX})$. In addition, as described above, the reception device transmits the second signal after n symbols. Upon receiving the second signal, the transmission device may perform FFT on N sampling values acquired from the time '$t_{s,Tx}+(n+1)*t\_symb$'. Thus, Delta_2=$t_{s,Tx}+(n+1)*t\_symb-t_{a,Tx}$ may be obtained through the corrected phase difference θ.

[Location Estimation]

Next, a location estimation method will be described.

Figure 3:
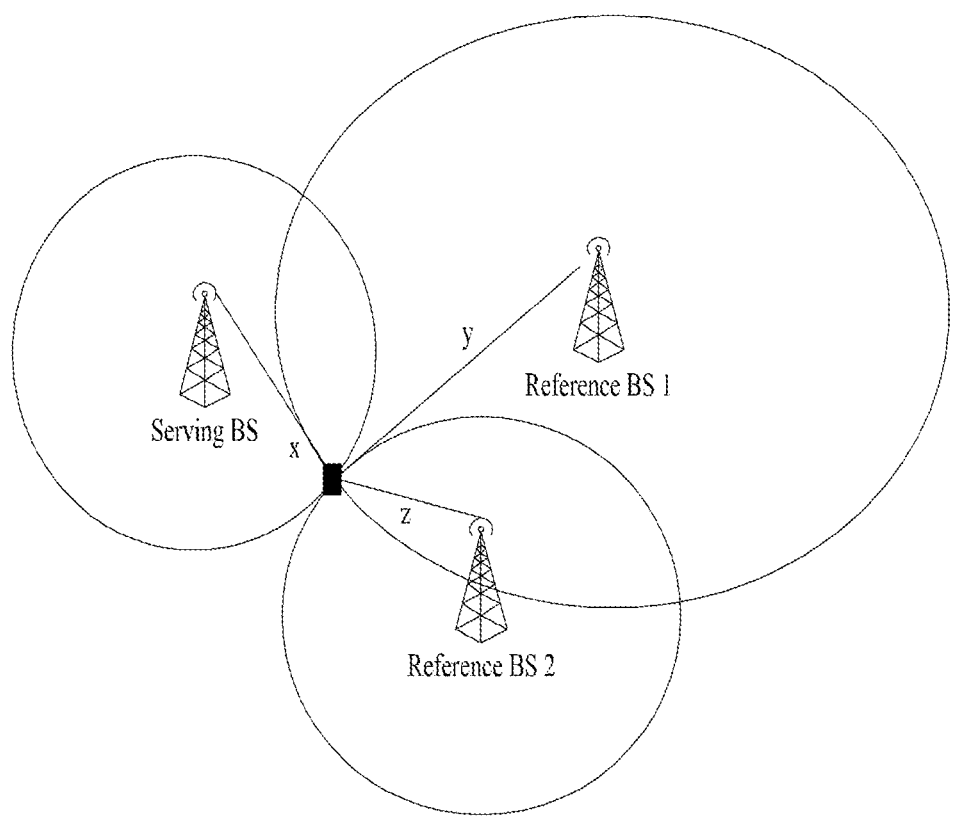
FIG. 3 illustrates an example of location estimation through triangulation.

FIG. 3 illustrates a method for location estimation through triangulation. In order to determine the location of a UE based on triangulation as shown in FIG. 3, a location server needs to know the distances of x, y, and z.

Figure 4:
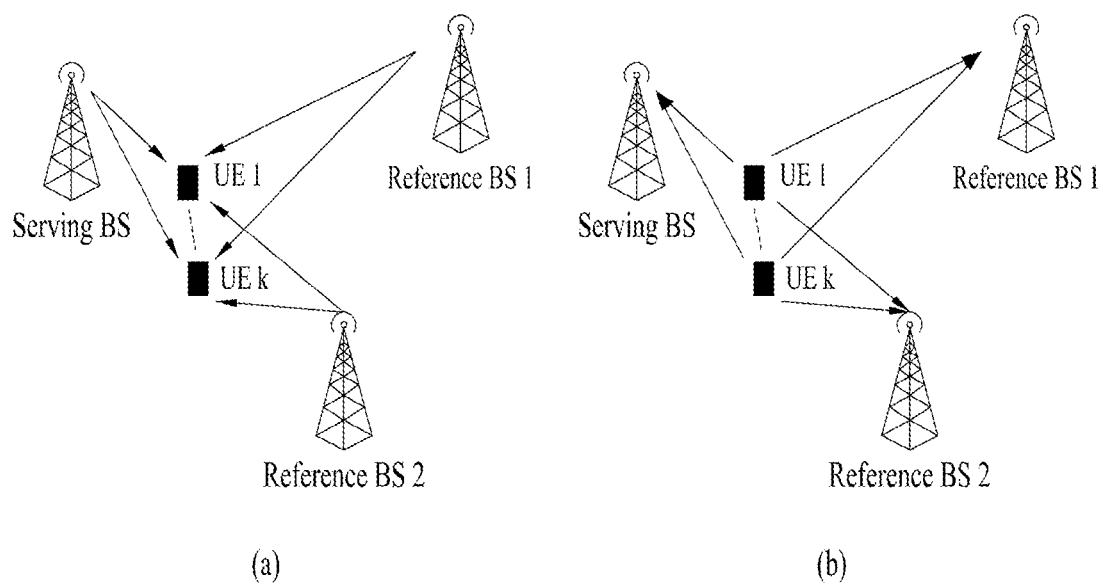
FIG. 4 illustrates an example of a method for location estimation using a phase difference.

FIG. 4 illustrates an example of a method for location estimation using a phase difference.

As described above, BSs may transmit a DL positioning reference signal (PRS) (e.g., the first signal) using different frequencies (e.g., FIG. 4(a)). The UE may measure the phase difference for the DL PRS received from each BS, and transmit the information of the measured phase difference to each BS through a UL PRS (e.g., the second signal) (e.g., FIG. 4(b)). Accordingly, each BS may obtain x, y, and z, which are distances between each BS and the UE. Each BS may transmit the information of distance x, y, z to the location server, and the location server may determine the location of the UE using a method such as triangulation.

For the location estimation method, a time at which each BS transmits a DL PRS (e.g., the first signal) should be scheduled, and a time at which each BS receives UL PRS carrying the phase difference information (e.g., second signal) from the UE should also be scheduled. In addition, in order to estimate the locations of a plurality of UEs present on a network, each BS needs to schedule DL/UL PRSs in consideration of not only UEs served by the BS but also UEs served by another BS.

In FIG. 4(b), when a BS receives phase difference information through a UL PRS from a UE for another BS, the BS may fail to accurately receive the phase difference information due to the constraint of the strength (e.g., Tx power) of the UL PRS.

Due to these causes, the result of measurement of the BS-to-UE distance by each BS may be inaccurate, and thus accuracy of the location of the UE calculated based on the inaccurate distance measurement may also be lowered.

In one embodiment of the present disclosure, in order to address such an issue, it is proposed that the UE transmit the phase difference information about the DL PRSs (e.g., the first signals) received from the respective BSs only to the serving BS by a UL PRS (e.g., the second signal), and the serving BS estimate the location of the UE based on the information. For example, the UE may transmit phase difference information for all BSs to the serving BS.

As an example, the UE measures a phase difference for each of the DL PRSs received from multiple BSs including the serving BS. Thereafter, the UE transmits the phase difference only to the serving BS through a UL PRS (e.g., the second signal). Additionally, the serving BS receives a PRS from another BS participating in the location measurement and measures a phase difference for the received PRS. The serving BS may identify the location of the UE based on the phase difference measured through the PRS received from another BS and the phase difference information received through the UL PRS of the UE.

Hereinafter, a method of estimating the location of a UE when the UE transmits a UL PRS only to the serving BS will be described in detail.

1. A Procedure of Transmitting DL PRS to Multiple BSs by a UE

Each BS may transmit a DL PRS to the UE for distance measurement. The UE may receive DL PRSs transmitted by multiple BSs. The DL PRS may be transmitted periodically. Information about the periodicity, resource location and/or offset of the DL PRS may be predefined for each BS or provided to the UE by physical layer/higher layer signaling.

As an example, the UE may calculate and report only phase difference information about DL PRSs of designated BSs instead of calculating phase difference information on all received DL PRSs. Information about the designated BSs (e.g., cell ID, PRS resource location, etc.) may be provided to the UE by higher layer/physical layer signaling.

For example, in FIG. 4, a UE may measure/report phase differences only for DL PRSs of a serving BS, Reference BS 1, and Reference BS 2 among the DL PRSs of multiple BSs.

Figure 5:
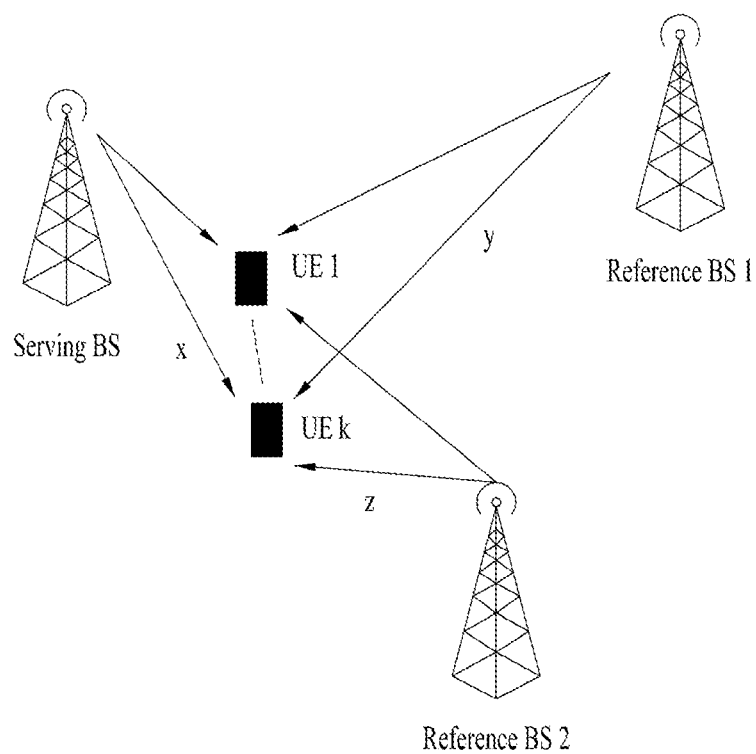
FIG. 5 illustrates an example in which base stations transmit a DL PRS to a UE.

FIG. 5 illustrates an example in which base stations transmit a DL PRS to a UE. Referring to FIG. 5, BSs participating in location estimation transmit DL PRSs to UEs. All BSs may simultaneously perform DL PRS transmission using different angular frequencies, or may sequentially perform DL PRS transmission. When the BSs transmit the DL PRS sequentially, the transmissions need to be scheduled to prevent interference between the DL PRS transmissions. In FIG. 5, x, y, and z represent distances between UE k and the BSs.

Figure 6:
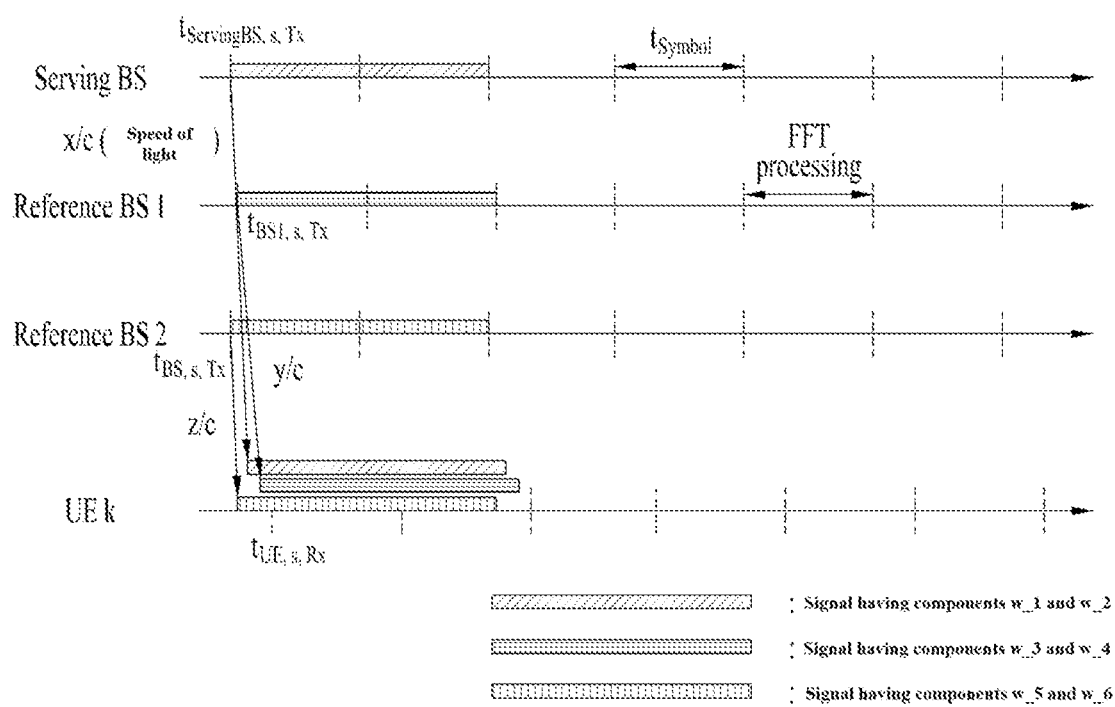
FIG. 6 illustrates an example of DL PRS transmission times of base stations.

FIG. 6 is a diagram for describing DL PRS transmission times of BSs according to an example of the present disclosure.

Referring to FIG. 6, the BSs transmit DL PRSs to UE k at the same time or similar times. For simplicity, it is assumed that the DL PRS is repeatedly transmitted in two symbols, but the present disclosure is not limited thereto. As another example, the DL PRS may be configured in one symbol duration and have cyclic prefix (CP) and data. In addition, although only one UE, UE k, is illustrated in FIG. 6, other UEs not shown in the figure may also operate in a similar manner to UE k.

DL PRS Transmission from the Serving BS to UE k

Initially, at time $t_{ServingBS,s,Tx}$, the serving BS transmits a DL PRS including a sinusoidal component having an angular frequency w1 and a sinusoidal component having an angular frequency w2. The sinusoidal component of the angular frequency w1 and the sinusoidal component of the angular frequency w2 transmitted by the serving BS may be expressed as Equation 4.

$$E(w_1,t,\text{ServingBS})=A(0)*\exp(j*(w_1*(t-t_{ServingBS,s,Tx})))$$

$$E(w_2,t,\text{ServingBS})=A(0)*\exp(j*(w_2*(t-t_{ServingBS,s,Tx})))$$ [Equation 4]

In Equation 4, A(0) denotes an amplitude of a signal at the location of the serving BS.

Since the serving BS and UE k are separated by a distance x, the DL PRS transmitted by the serving BS reaches UE k at $t=t_{ServingBS,s,Tx}+x/c$. The sinusoidal components of the DL PRS received by UE k may be respectively expressed as Equation 5.

$$E(w_1,t,UE)=A(x)*\exp(j*(w_1*t-w_1*t_{ServingBS,s,Tx}-k_1*x))$$

$$E(w_1,t,UE)=A(x)*\exp(j*(w_2*t-w_2*t_{ServingBS,s,Tx}-k_2*x))$$ [Equation 5]

In Equation 5, $k_i=w_i/c$ is defined, where c denotes the speed of light.

It is assumed that a time at which processing of a received signal (e.g., DL PRS) starts is quantized, and UE k starts signal processing of the DL PRS at $t=t_{UE,s,Rx}$. It is assumed that an FFT-based OFDM signal processing scheme is used. The result of FFT-based signal processing is obtained by multiplying the received signal (e.g., DL PRS) by sinusoidal signals of various frequencies with initial phase=0 and corresponding to multiples of the fundamental frequency and summing up the results of the multiplication. According to the characteristics of FFT, the sum of the results of multiplying the received signal by sinusoidal signals of frequencies different from the frequency of the received signal is 0. Therefore, only the values obtained by multiplying the received signal by the sinusoidal signals having the same frequency as the received signal remains. Accordingly, as a result of the FFT-based signal processing by the UE, the values obtained for the angular frequency components w1 and w2 are expressed as Equation 6.

$$X_{UE,Rx}(w_1)=A(x)*\exp(j*(w_1*(t_{UE,s,RX}-t_{ServingBS,s,TX})-k_1*x))$$

$$X_{UE,Rx}(w_2)=A(x)*\exp(j*(w_2*(t_{UE,s,RX}-t_{ServingBS,s,TX})-k_2*x))$$ [Equation 6]

In Equation 6, the ratio between $X_{UE,Rx}(w1)$ and $X_{UE,Rx}(w2)$ is expressed as Equation 7.

$$\frac{X_{UE,Rx}(w_2)}{X_{UE,Rx}(w_1)} = \exp(j*((w_2-w_1)(t_{UE,s,RX}-t_{ServingBS,s,TX})-(k_2-k_1)*x))$$ [Equation 7]

In this case, the phase difference between the two angular frequency components is expressed as Equation 8.

$$\arg(X) = \arg\left(\frac{X_{UE,Rx}(w_2)}{X_{UE,Rx}(w_1)}\right) = (w_2-w_1)(t_{UE,s,RX}-t_{ServingBS,s,TX})-(k_2-k_1)*x$$ [Equation 8]

DL PRS Transmission from Reference BS 1 to UE k

Reference BS 1 transmits a DL PRS including a sinusoidal component having an angular frequency w3 and a sinusoidal component having an angular frequency w3 at time $t_{BS1,s,Tx}$. The sinusoidal component of the angular frequency w3 and the sinusoidal component of the angular frequency w4 transmitted by Reference BS1 may be expressed as Equation 9.

$$E(w_3,t,BS1)=A(0)*\exp(j*(w_3*(t-t_{BS1,s,Tx})))$$

$$E(w_4,t,BS1)=A(0)*\exp(j*(w_4*(t-t_{BS1,s,Tx})))$$ [Equation 9]

In Equation 9, A(0) denotes the amplitude of the signal at the location of Reference BS 1.

Since Reference BS1 and UE k are separated by a distance y, the DL PRS transmitted by Reference BS1 reaches UE k at time $t=t_{BS1,s,Tx}+y/c$. The sinusoidal components of the DL PRS received by UE k may be respectively expressed as Equation 10.

$$E(w_3,t,UE)=A(y)*\exp(j*(w_3*t-w_3*t_{BS1,s,Tx}-k_3*y))$$

$$E(w_4,t,UE)=A(y)*\exp(j*(w_4*t-w_4*t_{BS1,s,Tx}-k_4*y))$$ [Equation 10]

In Equation 10, $k_i=w_i/c$ is defined, where c denotes the speed of light.

It is assumed that a time at which processing of a received signal (e.g., DL PRS) starts is quantized, and UE k starts signal processing of the DL PRS at $t=t_{UE,s,Rx}$. It is assumed that an FFT-based OFDM signal processing scheme is used. The result of FFT-based signal processing is obtained by multiplying the received signal (e.g., DL PRS) by sinusoidal signals of various frequencies with initial phase=0 and corresponding to multiples of the fundamental frequency and summing up the results of the multiplication. According to the characteristics of FFT, the sum of the results of multiplying the received signal by sinusoidal signals of frequencies different from the frequency of the received signal is 0. Therefore, only the values obtained by multiplying the received signal by the sinusoidal signals having the same frequency as the received signal remains. Accordingly, as a result of the FFT-based signal processing by the UE, the values obtained for the angular frequency components w3 and w4 are expressed as Equation 11.

$$X_{UE,Rx}(w_3)=A(y)*\exp(j*(w_3*(t_{UE,s,RX}-t_{BS1,s,TX})-k_3*y))$$

$$X_{UE,Rx}(w_4)=A(y)*\exp(j*(w_4*(t_{UE,s,RX}-t_{BS1,s,TX})-k_4*y))$$ [Equation 11]

In Equation 11, the ratio between $X_{UE,Rx}(w3)$ and $X_{UE,Rx}(w4)$ is expressed as Equation 12.

$$\frac{X_{UE,Rx}(w_4)}{X_{UE,Rx}(w_3)} = \exp(j*((w_4-w_3)(t_{UE,s,RX}-t_{BS1,s,RX})-(k_4-k_3)*y))$$ [Equation 12]

In this case, the phase difference between the two angular frequency components is expressed as Equation 13.

$$\arg(Y) = \arg\left(\frac{X_{UE,Rx}(w_4)}{X_{UE,Rx}(w_3)}\right) = (w_4-w_3)(t_{UE,s,RX}-t_{BS1,s,TX})-(k_4-k_3)*y$$ [Equation 13]

DL PRS Transmission from Reference BS 2 to UE k

Reference BS 2 transmits a DL PRS including a sinusoidal component having an angular frequency w5 and a sinusoidal component having an angular frequency w6 at time $t_{BS2,s,Tx}$. The sinusoidal component of the angular frequency w5 and the sinusoidal component of the angular frequency w6 transmitted by Reference BS 2 may be expressed as Equation 14.

$$E(w_5,t,BS2)=A(0)*\exp(j*(w_5*(t-t_{BS2,s,Tx})))$$

$$E(w_6,t,BS2)=A(0)*\exp(j*(w_6*(t-t_{BS2,s,Tx})))$$ [Equation 14]

In Equation 14, A(0) denotes the amplitude of the signal at the location of Reference BS 2.

Since Reference BS 2 and UE k are separated by a distance z, the signal transmitted by Reference BS2 reaches UE k at time $t=t_{BS2,s,Tx}+z/c$. The sinusoidal components of the DL PRS received by UE k may be respectively expressed as Equation 15.

$$E(w_5,t,UE)=A(z)*\exp(j*(w_5*t-w_5*t_{BS2,s,Tx}-k_5*z))$$

$$E(w_6,t,UE)=A(z)*\exp(j*(w_6*t-w_6*t_{BS2,s,Tx}-k_6*z))$$ [Equation 15]

In Equation 15, $k_i=w_i/c$ is defined, where c denotes the speed of light.

It is assumed that a time at which processing of a received signal (e.g., DL PRS) starts is quantized, and UE k starts signal processing of the DL PRS at $t=t_{UE,s,Rx}$. It is assumed that an FFT-based OFDM signal processing scheme is used. The result of FFT-based signal processing is obtained by multiplying the received signal (e.g., DL PRS) by sinusoidal signals of various frequencies with initial phase=0 and corresponding to multiples of the fundamental frequency and summing up the results of the multiplication. According to the characteristics of FFT, the sum of the results of multiplying the received signal by sinusoidal signals of frequencies different from the frequency of the received signal is 0. Therefore, only the values obtained by multiplying the received signal by the sinusoidal signals having the same frequency as the received signal remains. Accordingly, as a result of the FFT-based signal processing by the UE, the values obtained for the angular frequency components w5 and w6 are expressed as Equation 16.

$$X_{UE,Rx}(w_5)=A(z)*\exp(j*(w_5*(t_{UE,s,RX}-t_{BS2,s,TX})-k_5*z))$$

$$X_{UE,Rx}(w_6)=A(z)*\exp(j*(w_6*(t_{UE,s,RX}-t_{BS2,s,TX})-k_6*z))  \quad \text{[Equation 16]}$$

In Equation 16, the ratio between $X_{UE,Rx}(w_5)$ and $X_{UE,Rx}(w_6)$ is expressed as Equation 17.

$$\frac{X_{UE,Rx}(w_6)}{X_{UE,Rx}(w_5)} = \quad \text{[Equation 17]}$$

$$\exp(j*((w_6-w_5)(t_{UE,s,RX}-t_{BS2,s,TX})-(k_6-k_5)*z))$$

In this case, the phase difference between the two angular frequency components is expressed as Equation 18.

$$\arg(Z)=\arg\left(\frac{X_{UE,Rx}(w_6)}{X_{UE,Rx}(w_5)}\right)= \quad \text{[Equation 18]}$$

$$(w_6-w_5)(t_{UE,s,RX}-t_{BS2,s,TX})-(k_6-k_5)*z$$

PRS Subframe

Figure 7:
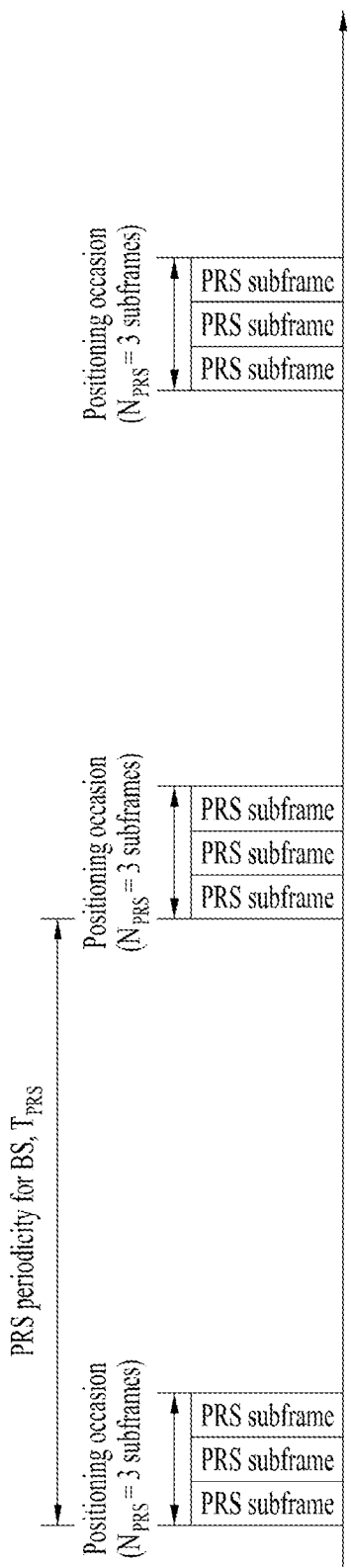
FIG. 7 illustrates an example of periodic DL PRS transmission.

FIG. 7 illustrates an example of periodic DL PRS transmission.

In FIG. 7, it is assumed that a DL PRS is transmitted within a positioning occasion occurring every specific period (e.g., TPRS). Referring to FIG. 7, the angular frequency of each BS is fixed within a positioning occasion, and each BS transmits one DL PRS subframe to the UE. Transmitting a DL PRS subframe may mean transmitting the DL PRS in a DL PRS subframe.

Figure 8:
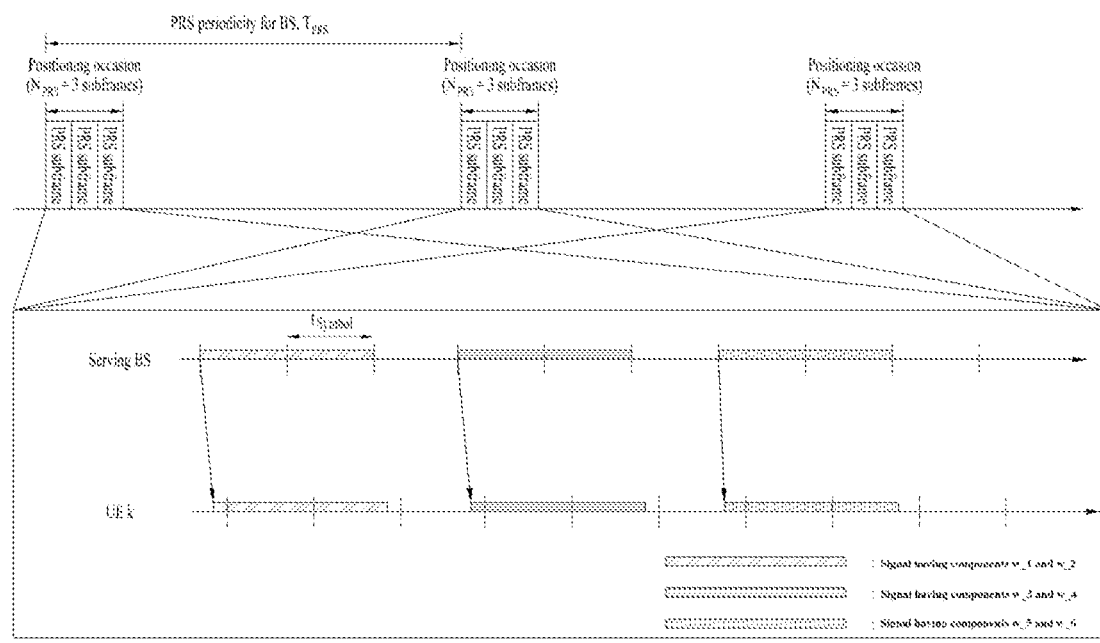
FIG. 8 illustrates another example of DL PRS transmission.

FIG. 8 illustrates another example of DL PRS transmission.

Referring to FIG. 8, a BS does not transmit one or more DL PRS subframes at a fixed angular frequency as in FIG. 7, but may transmit multiple DL PRS subframes while changing the angular frequency.

In order for the UE to calculate and report a phase difference for each DL PRS subframe, the BS may provide the UE with information about an angular frequency (e.g., an identifier for distinguishing angular frequencies) for each DL PRS subframe by higher layer/physical layer signaling. The UE may calculate phase differences for all DL PRS subframes based on the angular frequency changed every DL PRS subframe and report the calculated phase differences or only a phase difference for a DL PRS having good performance to the BS.

Figure 9:
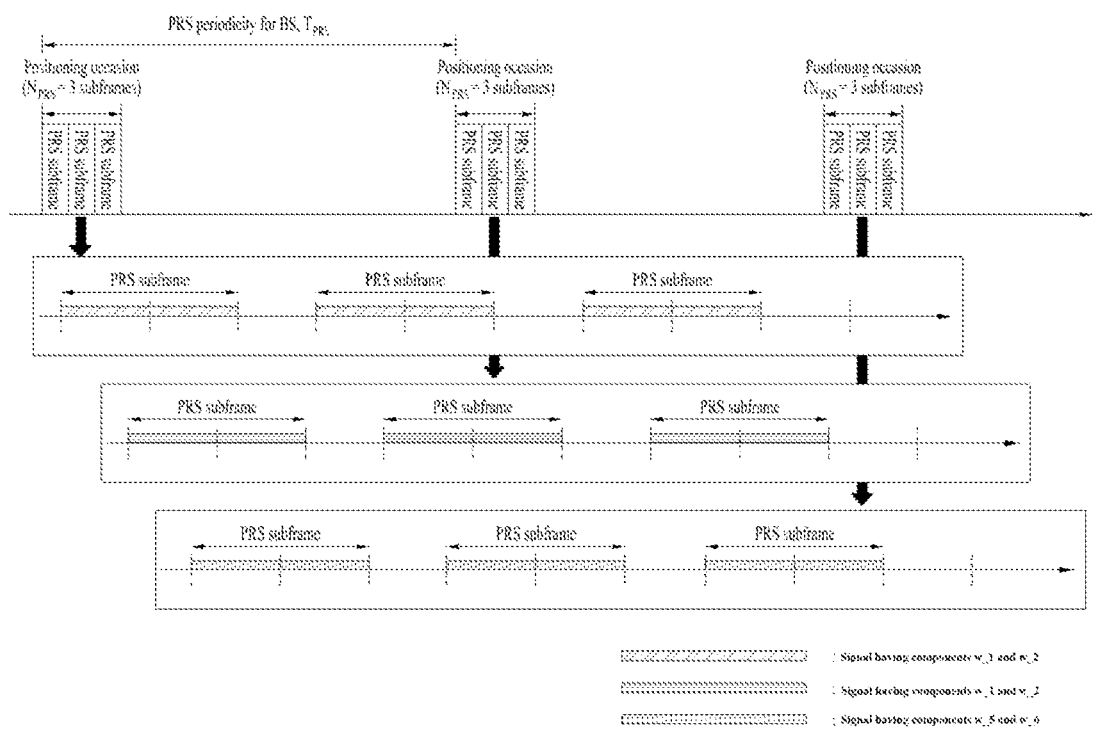
FIG. 9 illustrates another example of DL PRS transmission.

FIG. 9 illustrates another example of DL PRS transmission.

Referring to FIG. 9, during a positioning occasion, the BS transmits multiple DL PRS subframes having the same angular frequency. However, DL PRSs of different angular frequencies may be transmitted in the respective positioning occasions.

The UE may calculate and report a phase difference only for the DL PRS received for a predetermined time.

2. PRS Transmission from Reference BSs and UE to Serving BS

Figure 10:
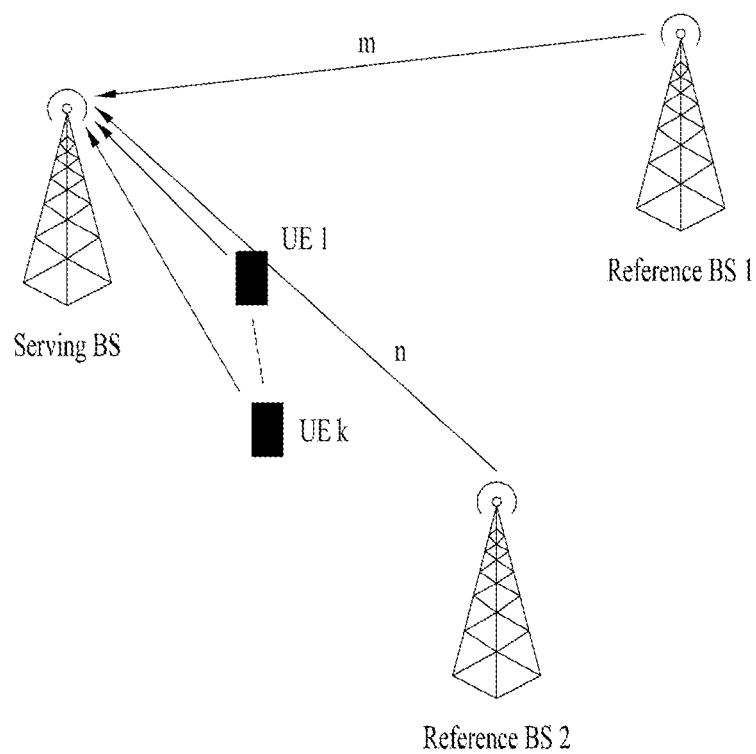
FIG. 10 illustrates an example in which reference base stations and UEs transmit a PRS to a serving base station.

FIG. 10 illustrates an example in which reference BSs and UEs transmit a PRS to a serving BS. Here, m and n represent the distances between the reference BSs and the serving BS.

A UE may calculate a phase difference for each received DL PRS and report the same to the serving BS through a UL PRS. The reference BSs also transmit a PRS to the serving BS. The serving BS may estimate the location of the UE as well as the distance from the UE based on the PRSs received from the UE and the reference BSs.

Figure 11:
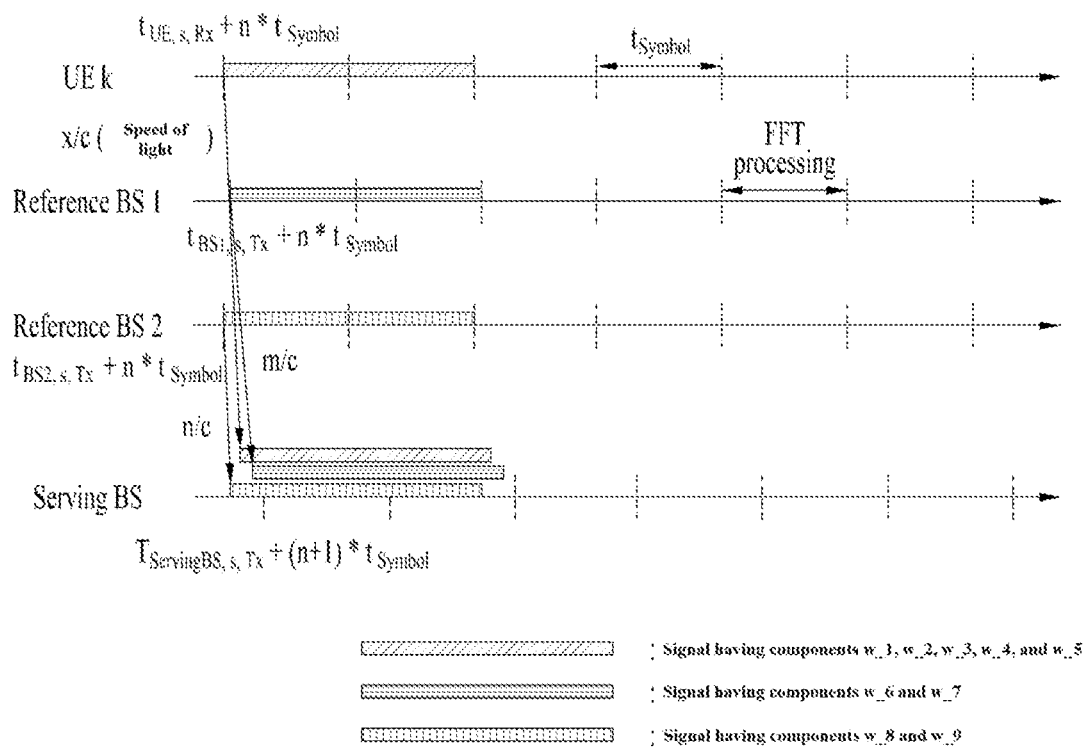
FIG. 11 illustrates an example of times at which reference base stations and UE k send a PRS to a serving base station.

FIG. 11 illustrates times at which reference BSs and UE k send a PRS to a serving BS according to an example of the present disclosure. The reference BSs and the UE transmit PRSs at similar times. For simplicity, it is assumed that a PRS is repeatedly transmitted in two symbols, but the PRS may be configured in one symbol duration and have a cyclic prefix (CP) and data.

PRS Transmission from Reference BSs to Serving BS

Reference BS 1 generates a PRS as represented by Equation 19 using angular frequencies w6 and w7 and transmits the same to the serving BS at time $t=t_{BS1,s,Tx}+n*t_{symb}$.

$$R(w_6,t,BS1)=A(0)*\exp(j*(w_6*(t-t_{BS1,s,Tx}-n*t_{symbol})))$$

$$R(w_7,t,BS2)=A(0)*\exp(j*(w_7*(t-t_{BS1,s,Tx}-n*t_{symbol}))) \quad \text{[Equation 19]}$$

The serving BS performs an FFT operation at $t=t_{ServingBS,s,Tx}+(n+1)*t_{symb}$, which is a quantized processing time, in a manner of multiplying a sinusoidal signal having an initial phase 0 by the PRS received from Reference BS 1. As a result, components as represented by Equation 20 are obtained for the angular frequencies w6 and w7.

$$X_{ServingBS,Rx}(w_6)=A(m)*\exp(j*(w_6(t_{ServingBS,s,Tx}-t_{BS1,s,Tx}+t_{symb})-k_6*m))$$

$$X_{ServingBS,Rx}(w_7)=A(m)*\exp(j*(w_7(t_{ServingBS,s,Tx}-t_{BS1,s,Tx}+t_{symb})-k_7*m)) \quad \text{[Equation 20]}$$

The phase difference between the two angular frequency components of Equation 20 is expressed as Equation 21.

$$\arg(M)=\arg\left(\frac{X_{ServingBS,Rx}(w_7)}{X_{ServingBS,Rx}(w_6)}\right)= \quad \text{[Equation 21]}$$

$$(w_7-w_6)(t_{ServingBS,s,Tx}-t_{BS1,s,Tx}+t_{symb})-(k_7-k_6)*m$$

Similarly to Equation 21, the phase difference between the angular frequency components of a PRS received by the serving BS from Reference BS 2 is expressed as Equation 22.

$$\arg(N)=\arg\left(\frac{X_{ServingBS,Rx}(w_9)}{X_{ServingBS,Rx}(w_8)}\right)= \quad \text{[Equation 22]}$$

$$(w_9-w_8)(t_{ServingBS,s,Tx}-t_{BS2,s,Tx}+t_{symb})-(k_9-k_8)*n$$

PRS Transmission from UE k to Serving BS

UE k generates a PRS such as Equation 23, using angular frequencies $w_1$, $w_2$, $w_3$, $w_4$, and $w_5$ and transmits the same to the serving BS at time $t=t_{UE,s,Rx}+n*t_{symb}$.

$$R(w_1,t,UE)=A(0)*\exp(j*(w_1*(t-t_{UE,s,RX}-n*t_{symbol})))$$

$$R(w_2,t,UE)=A(0)*\exp(j*(w_2*(t-t_{UE,s,Rx}-n*t_{symbol})))$$

$$R(w_3,t,UE)=A(0)*\exp(j*(w_3*(t-t_{UE,s,RX}-n*t_{symbol})+\arg(X)))$$

$$R(w_4,t,UE)=A(0)*\exp(j*(w_3*(t-t_{UE,s,Rx}-n*t_{symbol})+\arg(Y)))$$

$$R(w_5,t,UE)=A(0)*\exp(j*(w_3*(t-t_{UE,s,Rx}-n*t_{symbol})+\arg(Z)))  \quad \text{[Equation 23]}$$

The serving BS performs an FFT operation at time $t=t_{ServingBS,s,Tx}+(n+1)*t_{symb}$, which is a quantized processing time, in a manner of multiplying a sinusoidal signal having an initial phase 0 by the PRS received from Reference BS 1. As a result, components as represented by Equation 24 are obtained for the angular frequencies $w_1$, $w_2$, $w_3$, $w_4$ and $w_5$.

$$X_{ServingBS,Rx}(w_1)=A(x)*\exp(j*(w_1(t_{ServingBS,s,Tx}-t_{UE,s,Rx}+t_{symb})-k_1*x))$$

$$X_{ServingBS,Rx}(w_2)=A(x)*\exp(j*(w_2(t_{ServingBS,s,Tx}-t_{UE,s,Rx}+t_{symb})-k_2*x))$$

$$X_{ServingBS,Rx}(w_3)=A(x)*\exp(j*(w_3(t_{ServingBS,s,Tx}-t_{UE,s,Rx}+t_{symb})-k_3*x+\arg(X)))$$

$$X_{ServingBS,Rx}(w_4)=A(x)*\exp(j*(w_4(t_{ServingBS,s,Tx}-t_{UE,s,Rx}+t_{symb})-k_4*x+\arg(Y)))$$

$$X_{ServingBS,Rx}(w_5)=A(x)*\exp(j*(w_5(t_{ServingBS,s,Tx}-t_{UE,s,Rx}+t_{symb})-k_5*x+\arg(Z))) \quad \text{[Equation 24]}$$

The serving BS may obtain x, y, and z, which are distances between the respective BSs and the UE, based on the components of the angular frequencies of Equation 24.

The ratio between the two components obtained for $w_2$ and $w_3$ is given as Equation 25.

$$\frac{X_{ServingBS,Rx}(w_3)}{X_{ServingBS,Rx}(w_2)} = \frac{\exp(j*(w_3(t_{ServingBS,s,Tx}-t_{UE,s,Rx}+t_{symb})-k_3*\arg(X)))}{\exp(j*(w_2(t_{ServingBS,s,Tx}-t_{UE,s,Rx}+t_{symb})-k_2*x))}$$

$$= \exp(j*((w_3-w_2)(t_{ServingBS,s,Tx}-t_{UE,s,Rx}+t_{symb}-x/c)+(w_2-w_1)(t_{UE,s,Rx}-t_{ServingBS,s,Tx}-x/c))) \quad \text{[Equation 25]}$$

When $w_3-w_2=w_2-w_1$, the ratio between the two components for $w_2$ and $w_3$ is expressed as Equation 26.

$$\frac{X_{ServingBS,Rx}(w_3)}{X_{ServingBS,Rx}(w_2)} = \exp(j*(w_2-w_1)(t_{symb}-2x/c)) \quad \text{[Equation 26]}$$

Since the length of an OFDM symbol, $t_{symb}$, is determined, the distance x between the serving BS and UE k may be calculated.

When the length of an OFDM symbol, $t_{symb}$, and the distance x are determined, a value of $t_{ServingBS,s,Tx}-t_{UE,s,Rx}$ may be obtained based on the phase difference between the components of $w_1$ and $w_2$. Using the obtained value of $t_{ServingBS,s,Tx}-t_{UE,s,Rx}$ and the phase differences of the components obtained for $w_3$, $w_4$ and $w_5$, $\arg(X)$, $\arg(Y)$ 및 arg (Z) may be calculated.

When it is assumed that the difference between consecutive angular frequencies is constant, the difference between arg(Y) and arg(M) may be expressed as Equation 27.

$$\arg(Y)-\arg(M)=(w_4-w_3)(t_{UE,s,RX}-t_{ServingBS,s,Tx})-(k_4-k_3)*(y-m) \quad \text{[Equation 27]}$$

Therefore, the value of y−m obtained by subtracting the distance m between the serving BS and Reference BS 1 from the distance y between UE k and Reference BS 1 may be calculated as Equation 28.

$$y-m = \frac{\arg(Y)-\arg(M)-(w_4-w_3)(t_{UE,s,Rx}-t_{ServingBS,s,Rx})}{(k_4-k_3)} \quad \text{[Equation 28]}$$

The value of z−n obtained by subtracting the distance n between the serving BS and Reference BS 2 from the distance z between UE k and the Reference BS 2 may be calculated as Equation 29.

$$z-n = \frac{\arg(Z)-\arg(N)-(w_6-w_5)(t_{UE,s,Rx}-t_{ServingBS,s,Rx})}{(k_6-k_5)} \quad \text{[Equation 29]}$$

Since the locations of all BSs are fixed, information about m and n, which are the distance between the serving BS and the respective BSs, may be pre-known to the serving BS (for example, it may be obtained from the location server). Accordingly, the serving BS may calculate y and z, which are distances between the respective reference BSs and the UE. In addition, when the serving BS transmits the distance information x, y, z to the location server, the location server may estimate the location of the UE.

In this way, the location of the UE as well as the distances between the BSs and the UE may be estimated.

As illustrated in FIG. 11, the reference BSs may also transmit PRSs to the serving BS. Each Reference BS and the UE may simultaneously perform PRS transmission to the serving BS using different angular frequencies, or may sequentially perform PRS transmission. When the PRSs are sequentially transmitted, they need to scheduled so as not to cause interference between the PRS transmissions in order to improve accuracy of the location estimation. Accordingly, each reference BS and the UE may receive information (e.g., transmission time, PRS resource, etc.) about a rule for transmission of PRSs to the serving BS from the location server by physical layer/high layer signaling.

When the serving BS intends to identify only the distance from the UE, the UE does not need to transmit phase difference information about the DL PRSs of the reference BSs to the serving BS, and the serving BS does not need to receive PRSs from the reference BSs. Related information may be configured by the location server.

The UE may not transmit all the phase differences for the DL PRSs of the reference BSs but selectively transmit the phase differences to the serving BS. Estimating the location of the UE based on a DL PRS of which the signal strength is low among the DL PRSs received from the reference BSs may lower the accuracy thereof. In addition, since the resources of the UL PRS available to the UE are limited, the UE may selectively transmit only phase difference information for a DL PRS having a great signal strength to the serving BS.

The UE may transmit all phase differences to the serving BS simultaneously in one UL PRS subframe, or may use multiple UL PRS subframes to transmit the phase difference information to the serving BS with higher accuracy. For example, the UE may transmit the respective phase differences to the serving BS through different UL PRS subframes. Accordingly, the network may inform the UE of information about the phase differences that should be transmitted in the respective UL PRS subframes, through a higher layer/physical layer. For example, if there are three UL PRS subframes for transmission from the UE to the serving BS, the UE may transmit phase difference information about the DL PRS of the serving BS in a first UL PRS subframe, transmit phase difference information about the DL PRS of Reference BS 1 in a second UL PRS subframe, and transmit phase difference information about the DL PRS of Reference BS 2 in a third UL PRS subframe.

Figure 12:
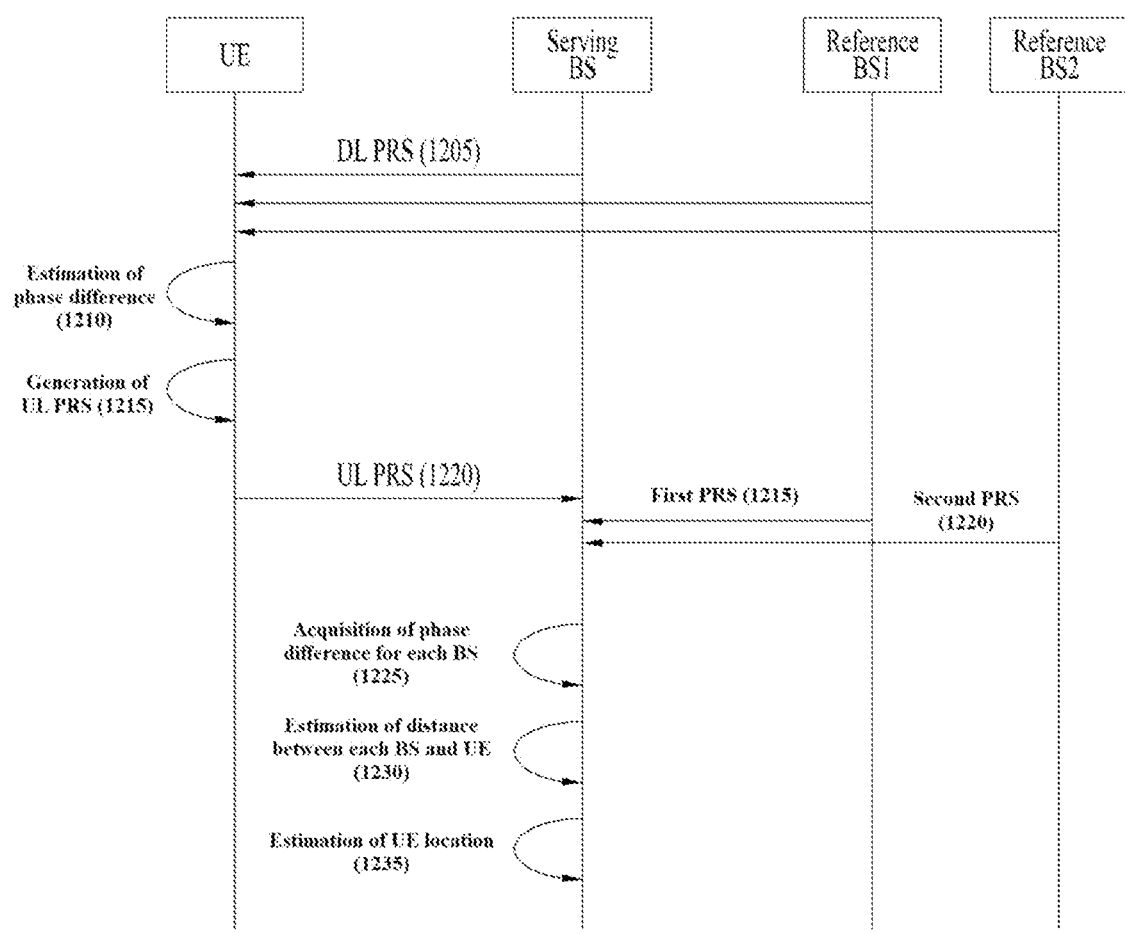
FIG. 12 illustrates a flow of a method for transmitting and receiving a reference signal for location estimation according to an example of the present disclosure.

FIG. 12 illustrates a flow of a method for transmitting and receiving a reference signal for location estimation according to an example of the present disclosure.

A UE receives a downlink (DL) positioning reference signal (PRS) from each of a serving BS and reference BSs (1205).

The UE measures a phase difference between sinusoidal components included in the DL PRS for each of the serving BS and the reference BSs (1210).

The UE generates an uplink (UL) PRS based on the measured phase differences (1215).

The UE transmits the UL PRS to the serving BS (1220).

The UE may report the phase difference measured for the serving BS and the phase differences measured for the reference BSs to the serving BS through the transmission of the UL PRS. For example, the UL PRS generated by the UE may include a first sinusoidal component representing the phase difference measured for the serving BS, a second sinusoidal component representing the phase difference measured for a first reference BS among the reference BSs, and a third sinusoidal component representing the phase difference measured for the second reference BS. The first sinusoidal component may correspond to $A*\exp(j*(w*(t-t_{UE,s,Rx}-n*t_{symbol})+arg1)))$, the second sinusoidal component may correspond to $A*\exp(j*(w*(t-t_{UE,s,Rx}-n*t_{symbol})+arg2)))$, and the third sinusoidal component may correspond to $A*\exp(j*(w*(t-t_{UE,s,Rx}-n*t_{symbol})+arg3)))$, where 'A' may denote the amplitude of the UL PRS, 'w' may denote the angular frequency, 't' may denote the transmission time of the UL PRS, and '$t_{UE,s,Rx}$' may denote the time at which signal processing of the DL PRS starts, 'n' may denote the number of symbols between the symbol on which the DL PRS is received and the symbol on which the UL PRS is transmitted, '$t_{symbol}$' may denote the duration of one symbol, 'arg1' may denote a phase difference measured for the serving BS, 'arg2' may denote a phase difference measured for the first reference BS, and 'arg3' may denote a phase difference measured for the second reference BS.

The phase difference measured for the serving BS may correspond to $(w_2-w_1)(t_{UE,s,RX}-t_{ServingBs,s,Tx})-(w_2/c-w_1/c)*x$, where 'w1' and 'w2' may denote the angular frequencies of the sinusoidal components included in the DL PRS of the serving BS, '$t_{UE,s,Rx}$' may denote the time at which signal processing of the DL PRS starts, '$t_{ServingBs,s,Tx}$' may denote the time at which the serving BS transmits the DL PRS, 'c' may denote the speed of light, and 'x' may denote the distance between the serving BS and the UE.

The UE may select reference BSs having transmitted DL PRSs whose signal strength exceeds a threshold among the reference BSs, and report the phase differences for the selected reference BSs through the UL PRS.

The serving BS receives an UL PRS 1220 from the UE, a first PRS 1221 from the first reference BS, and a second PRS 1222 from the second reference BS, respectively.

The serving BS may acquire a first phase difference measured by the UE for the sinusoidal components of the DL PRS of the serving BS, a second phase measured by the UE for the sinusoidal components of the DL PRS of the first reference BS, and a third phase difference measured by the UE for the sinusoidal components of the DL PRS of the second reference BS through the UL PRS (1225).

The serving BS may estimate the distance between the UE and the serving BS, the distance between the UE and the first reference BS, and the distance between the UE and the second reference BS based on the UL PRS, the first PRS, and the second PRS (1230). For example, the serving BS may estimate the distance between the UE and the serving BS based on the first phase difference, estimate the distance between the UE and the first reference BS based on the second phase difference and the first PRS, and estimate the distance between the UE and the second reference BS based on third phase difference and the second PRS.

The distance between the UE and the first reference BS may correspond to $arg4-(w_4-w_3)*(t_{UE,s,Rx}-t_{ServingBS,s,Rx})\}/(w_4/c-w_3/c)$, where 'arg2' may denote the second phase difference, 'arg4' may denote the phase difference measured by the serving BS through the first PRS, 'w3' and 'w4' may denote the angular frequencies of the sinusoidal components of the DL PRS of the first reference BS, and '$t_{UE,s,Rx}$' may denote the time at which signal processing of the DL PRS of the first reference BS starts, '$t_{ServingBS,s,Rx}$' may denote the time at which the serving BS starts signal processing of the first PRS, and 'c' may denote the speed of light.

The serving BS may estimate the location of the UE based on the distance between the UE and the serving BS, the distance between the UE and the first reference BS, and the distance between the UE and the second reference BS (1235).

Figure 13:
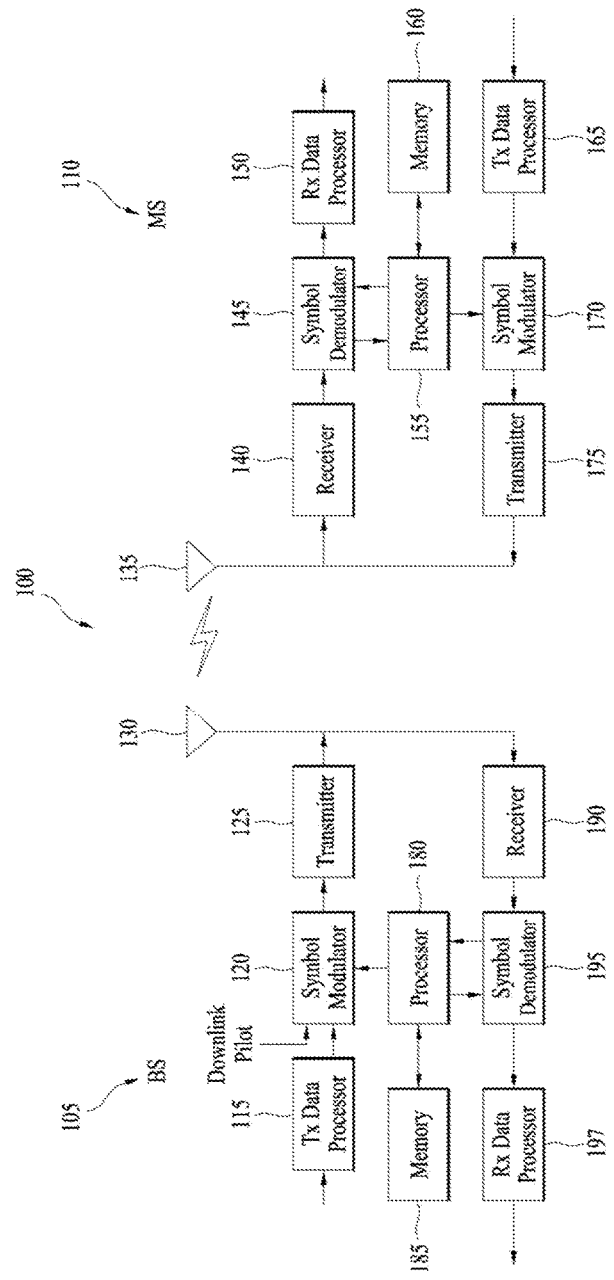
FIG. 13 is a block diagram illustrating a transmission apparatus and a reception apparatus according to an embodiment of the present disclosure.

FIG. 13 is a block diagram illustrating the configurations of a transmission device 105 and a reception device 110 in a wireless communication system 100 according to an embodiment of the present disclosure. For convenience, while it is assumed that the transmission device is a base station (BS) and the reception device is a terminal, the present disclosure is not limited thereto, and each of the transmission device and the reception device may be interpreted as any wireless node.

The BS may also be referred to as an eNB or gNB. The terminal may be referred to as a UE.

Although one transmission device 105 and one reception device 110 are shown to simplify the wireless communication system 100, the wireless communication system 100 may include one or more transmission devices and/or one or more reception devices.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present disclosure support a multiple input multiple output (MIMO) system. The BS 105 according to the present disclosure can support both a single user-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a time division multiplexing (TDM) symbol, or a code division multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present disclosure may be implemented in the form of modules, procedures, functions, etc. which perform the above-described functions or operations. Firmware or software implemented in the present disclosure may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A radio resource control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the disclosure. Thus, it is intended that the present disclosure covers the modifications and variations of this disclosure that come within the scope of the appended claims and their equivalents.

INDUSTRIAL APPLICABILITY

As described above, the present disclosure may be applied to various wireless communication systems.

The invention claimed is:

1. A method for transmitting and receiving, by a terminal, a signal for location estimation in a wireless communication system, the method comprising:
   receiving a downlink (DL) positioning reference signal (PRS) from each of a serving base station and reference base stations;
   measuring a phase difference between sinusoidal components included in the DL PRS for each of the serving base station and the reference base stations;
   generating an uplink (UL) PRS based on the measured phase differences; and
   transmitting the UL PRS to the serving base station,
   wherein the terminal reports the phase difference measured for the serving base station and the phase differences measured for the reference base stations to the serving base station through the transmitting of the UL PRS,
   wherein, the phase difference measured for the serving base station is related to $(w_2-w_1)(t_{UE,s,Rx}-t_{ServingBs,s,Tx})-(w_2/c-w_1/c)*x$, and
   wherein 'w1' and 'w2' denote angular frequencies of the sinusoidal components included in the DL PRS of the serving base station, '$t_{UE,s,Rx}$' denotes a time for starting signal processing of the DL PRS, '$t_{ServingBs,s,Tx}$' denotes a time for transmission of the DL PRS by the serving base station, 'c' denotes a speed of light, and 'x' denotes a distance between the serving base station and the terminal.

2. The method of claim 1, wherein the UL PRS generated by the terminal comprises a first sinusoidal component representing the phase difference measured for the serving base station, a second sinusoidal component representing the phase difference measured for a first reference base station among the reference base stations, a third sinusoidal component representing the phase difference measured for a second reference base station.

3. The method of claim 2, wherein:
   the first sinusoidal component is related to $A*exp(j*(w*(t-t_{UE,s,Rx}-n*t_{symbol})+arg1))$;
   the second sinusoidal component is related to $A*exp(j*(w*(t-t_{UE,s,Rx}-n*t_{symbol})+arg2))$; and
   the third sinusoidal component is related to $A*exp(j*(w*(t-t_{UE,s,Rx}-n*t_{symbol})+arg3))$,
   wherein 'A' denotes an amplitude of the UL PRS, 'w' denotes an angular frequency, 't' denotes a transmission time of the UL PRS, 'n' denotes the number of symbols between a symbol for reception of the DL PRS and a symbol for transmission of the UL PRS, '$t_{symbol}$' denotes a duration of one symbol, 'arg1' denotes the phase difference measured for the serving base station, 'arg2' denotes the phase difference measured for the first reference base station, and 'arg3' denotes the phase difference measured for the second reference base station.

4. The method of claim 1, wherein the terminal selects reference base stations having transmitted the DL PRSs of a signal strength exceeding a threshold among the reference base stations, and reports the phase differences for the selected reference base stations through the UL PRS.

5. A terminal for transmitting and receiving a signal for location estimation, comprising:
   a transceiver; and
   a processor configure to control the transceiver to:
   receive a downlink (DL) positioning reference signal (PRS) from each of a serving base station and reference base stations;
   measure a phase difference between sinusoidal components included in the DL PRS for each of the serving base station and the reference base stations;
   generate an uplink (UL) PRS based on the measured phase differences; and
   transmit the UL PRS to the serving base station,
   wherein the processor reports the phase difference measured for the serving base station and the phase differences measured for the reference base stations to the serving base station through transmission of the UL PRS,
   wherein, the phase difference measured for the serving base station is related to $(w_2-w_1)(t_{UE,s,Rx}-t_{ServingBs,s,Tx})-(w_2/c-w_1/c)*x$,
   wherein 'w1' and 'w2' denote angular frequencies of the sinusoidal components included in the DL PRS of the serving base station, '$t_{UE,s,Rx}$' denotes a time for starting signal processing of the DL PRS, '$t_{ServingBs,s,Tx}$' denotes a time for transmission of the DL PRS by the serving base station, 'c' denotes a speed of light, and 'x' denotes a distance between the serving base station and the terminal.

6. The terminal of claim 5, wherein the terminal is capable of communicating with at least one of another terminal, a terminal related to an autonomous driving vehicle, a base station or a network.

7. The terminal of claim 5, wherein the UL PRS generated by the terminal comprises a first sinusoidal component representing the phase difference measured for the serving base station, a second sinusoidal component representing the phase difference measured for a first reference base station among the reference base stations, a third sinusoidal component representing the phase difference measured for a second reference base station.

8. The terminal of claim 7, the first sinusoidal component is related to $A*exp(j*(w*(t-t_{UE,s,Rx}-n*t_{symbol})+arg1))$;
   the second sinusoidal component is related to $A*exp(j*(w*(t-t_{UE,s,Rx}-n*t_{symbol})+arg2))$; and
   the third sinusoidal component is related to $A*exp(j*(w*(t-t_{UE,s,Rx}-n*t_{symbol})+arg3))$,
   wherein 'A' denotes an amplitude of the UL PRS, 'w' denotes an angular frequency, 't' denotes a transmission time of the UL PRS, 'n' denotes the number of symbols between a symbol for reception of the DL PRS and a symbol for transmission of the UL PRS, '$t_{symbol}$' denotes a duration of one symbol, 'arg1' denotes the phase difference measured for the serving base station, 'arg2' denotes the phase difference measured for the first reference base station, and 'arg3' denotes the phase difference measured for the second reference base station.

* * * * *